(12) United States Patent
Mitsutomi

(10) Patent No.: US 11,885,392 B2
(45) Date of Patent: Jan. 30, 2024

(54) TOOTHED BELT MADE OF RUBBER, AND RUBBER COMPOSITION

(71) Applicant: Mitsuboshi Belting Ltd., Kobe (JP)

(72) Inventor: Manabu Mitsutomi, Hyogo (JP)

(73) Assignee: Mitsuboshi Belting Ltd., Kobe (JP)

( * ) Notice: Subject to any disclaimer, the term of this patent is extended or adjusted under 35 U.S.C. 154(b) by 338 days.

(21) Appl. No.: 17/292,839

(22) PCT Filed: Nov. 21, 2019

(86) PCT No.: PCT/JP2019/045631
§ 371 (c)(1),
(2) Date: May 11, 2021

(87) PCT Pub. No.: WO2020/110907
PCT Pub. Date: Jun. 4, 2020

(65) Prior Publication Data
US 2021/0396297 A1    Dec. 23, 2021

(30) Foreign Application Priority Data

Nov. 27, 2018   (JP) ................................. 2018-221012
Oct. 25, 2019   (JP) ................................. 2019-194368

(51) Int. Cl.
| | | |
|---|---|---|
| *C08L 15/00* | (2006.01) | |
| *C08K 3/26* | (2006.01) | |
| *C08K 3/013* | (2018.01) | |
| *C09J 119/02* | (2006.01) | |
| *B29D 29/08* | (2006.01) | |
| *F16G 1/08* | (2006.01) | |
| *C08K 5/09* | (2006.01) | |
| *C09J 161/12* | (2006.01) | |
| *F16G 1/28* | (2006.01) | |
| *C08K 5/098* | (2006.01) | |

(52) U.S. Cl.
CPC .............. *F16G 1/08* (2013.01); *B29D 29/08* (2013.01); *C08K 3/013* (2018.01); *C08K 3/26* (2013.01); *C08K 5/09* (2013.01); *C08K 5/098* (2013.01); *C08L 15/005* (2013.01); *C09J 161/12* (2013.01); *F16G 1/28* (2013.01); *C08K 2003/265* (2013.01)

(58) Field of Classification Search
CPC . C08L 15/00; C08K 3/26; C08K 3/013; C09J 119/02; B29D 29/08
USPC ........................................................... 474/205
See application file for complete search history.

(56) References Cited

U.S. PATENT DOCUMENTS

| | | | |
|---|---|---|---|
| 5,501,643 A | 3/1996 | Isshiki et al. | |
| 5,584,771 A | 12/1996 | Isshiki et al. | |
| RE36,870 E | 9/2000 | Isshiki et al. | |
| 2011/0118068 A1* | 5/2011 | Mitsutomi ................ | F16G 1/10 474/205 |

FOREIGN PATENT DOCUMENTS

| | | | | |
|---|---|---|---|---|
| CN | 1107099 | A | 8/1995 | |
| CN | 102094936 | A | 6/2011 | |
| CN | 102532770 | A | 7/2012 | |
| DE | 19547025 | A1 | 6/1997 | |
| EP | 795580 | B1 | 3/2001 | |
| JP | 2007-071228 | A | 3/2007 | |
| JP | 2011-122719 | A | 6/2011 | |
| JP | 2016-183779 | A | 10/2016 | |
| JP | 2018-185041 | A | 11/2018 | |
| WO | WO-2015030134 | A1 * | 3/2015 | ............. B29D 29/08 |

OTHER PUBLICATIONS

Feb. 10, 2020—International Search Report—Intl App PCT/JP2019/045631.
May 6, 2022—(CN) Notification of First Office Action—CN App 201980077587.7, Eng Tran.
Jul. 22, 2022—(EP) Extended EP Search Report—EP App 19890808.9.
Jan. 4, 2023—(EP) Office Action—EP App 19890808.9.

* cited by examiner

*Primary Examiner* — Deve V Hall
(74) *Attorney, Agent, or Firm* — Banner & Witcoff, Ltd.

(57) ABSTRACT

A rubber toothed belt includes a belt main body including a plurality of tooth portions provided at predetermined intervals along a longitudinal direction of the belt and including a first rubber composition, in which the first rubber composition includes a composite polymer including a hydrogenated nitrile rubber and an unsaturated carboxylic acid metal salt in a mass ratio of the former/the later=100/80 to 100/180, and includes, with respect to 100 parts by mass of the composite polymer, 3 parts by mass to 50 parts by mass of a zinc oxide, 3 parts by mass to 50 parts by mass of a non-reinforcing filler, 10 parts by mass or less of a reinforcing filler, 5 parts by mass or less of short fibers, and 1 part by mass to 5 parts by mass of an organic peroxide.

9 Claims, 1 Drawing Sheet

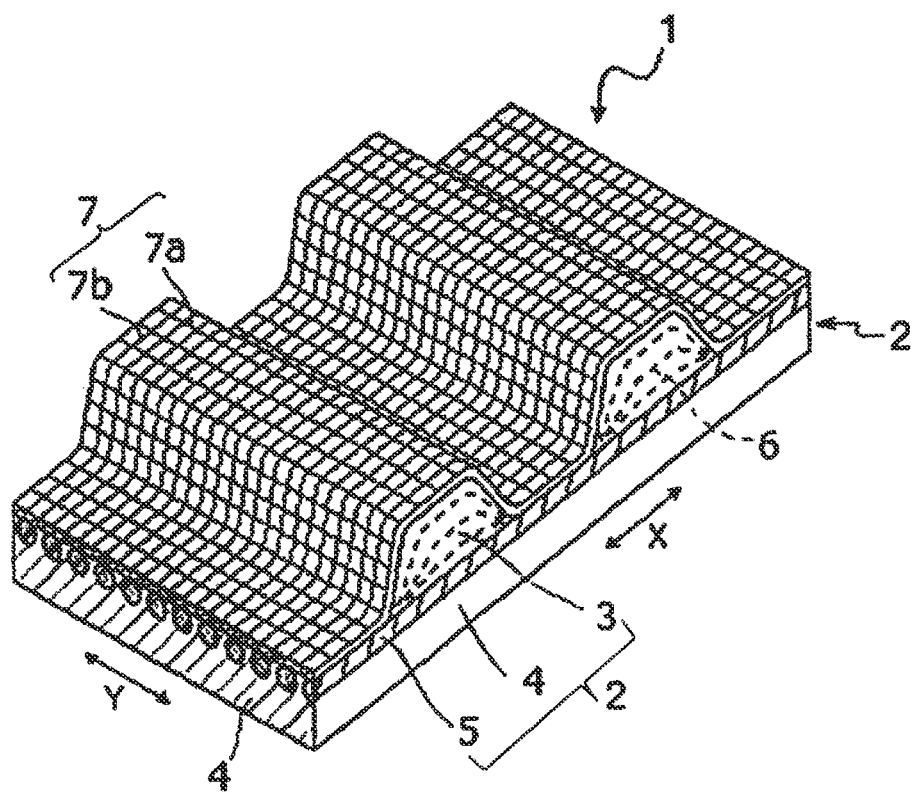

TOOTHED BELT MADE OF RUBBER, AND RUBBER COMPOSITION

CROSS REFERENCE TO RELATED APPLICATIONS

This is a U.S. National Phase Application under 35 U.S.C. § 371 of International Application No. PCT/JP2019/045631, filed Nov. 21, 2019, which claims priority to Japanese Application Nos. 2018-221012, filed Nov. 27, 2018, and 2019-194368, filed Oct. 25, 2019, which was published Under PCT Article 21(2), the entire contents of which are incorporated herein by reference.

TECHNICAL FIELD

The present invention relates to a rubber toothed belt (or a rubber toothed belt with a tooth cloth coating the belt) which meshes with a toothed pulley and is useful for synchronously transmitting power in a general industrial machine or the like under high load conditions, and a rubber composition (or a rubber composition for a toothed belt) useful for forming the rubber toothed belt.

BACKGROUND ART

One of the accident modes of the rubber toothed belt includes a tooth crack where a tooth portion is missing from the belt main body. It is considered that the tooth crack occurs due to repeated deformation of the tooth rubber in a process in which stress is intensively applied to the root of the tooth portion. It is also known that when the tooth rubber ages due to heat or the like, the tooth crack is facilitated.

As a method of improving the life of the toothed belt (tooth crack resistance), JP-A-2011-122719 (Patent Literature 1) discloses a rubber toothed belt in which a tooth portion is formed of a rubber composition by blending 3 parts by mass to 7 parts by mass of short fibers and 10 parts by mass or less of a powdery inorganic filler with respect to 100 parts by mass of a polymer obtained by mixing hydrogenated nitrile rubber and an unsaturated carboxylic acid metal salt at a mass ratio of 100/100 to 100/180. Patent Literature 1 describes that when such a rubber composition is used, the hardness of the tooth portion is sufficiently high, a modulus of the tooth portion can be increased, and the life of the rubber toothed belt can be expected to be extended by preventing the tooth crack or the like. Patent Literature 1 describes that by setting the blending amount of the powdery inorganic filler to 10 parts by mass or less, heat generation of the rubber composition constituting the tooth portion can be suppressed to a low level. In Patent Literature 1, examples of the powdery inorganic fillers include carbon black and silica which are known as reinforcing fillers, and these two types of fillers are also used in Examples.

In the invention according to Patent Literature 1, although a certain effect can be obtained with respect to the improvement of the tooth crack resistance, further improvement has been demanded from the needs of the market for increasing transmission power and extending the life of the toothed belt.

CITATION LIST

Patent Literature

Patent Literature 1: JP-A-2011-122719 (Claims, [0008] [0031], Examples)

SUMMARY OF INVENTION

Technical Problem

Accordingly, an object of the present invention is to provide a rubber toothed belt and a rubber composition which can significantly improve the life (tooth crack resistance) by increasing the hardness and modulus of the tooth portion to suppress the growth of cracks and also suppress the occurrence of microcracking that causes the growth of cracks.

Another object of the present invention is to provide a rubber toothed belt and a rubber composition which can extend the life of the toothed belt and are excellent in durability even when the tooth crack resistance is greatly improved and the transmission power is increased.

Still another object of the present invention is to provide a rubber toothed belt and a rubber composition in which the tooth crack resistance is significantly improved even when the content of the short fibers is small.

Solution to Problem

The present inventors assumed a mechanism in which microcracking first occurred in the tooth root and then the cracks grow as to the cause of the occurrence of the tooth crack. That is, the invention according to Patent Literature 1 is considered to be focused on suppressing the deformation of the tooth rubber and suppressing the growth of the cracks by increasing the hardness and modulus of the tooth portion. However, since the short fibers are blended in a relatively large proportion, microcracking are relatively easy to occur from an interface between the short fibers and the polymer in the rubber composition. By such a reason, in the invention according to Patent Literature 1, it is considered that even when the growth of cracks can be suppressed, the occurrence of cracks cannot be effectively suppressed, and the tooth crack resistance of the toothed belt cannot be significantly improved.

As a result of further studies on the method of effectively suppressing the growth of cracks and also highly suppressing the occurrence of cracks, the present inventors have found that in the rubber composition forming the tooth portion, the occurrence of cracks can be suppressed by reducing the blending amount of the short fibers, the hardness and the modulus of the tooth portion can be increased to suppress the growth of cracks and also the occurrence of microcracking causing the growth of cracks by increasing the blending amount of zinc oxide and the non-reinforcing filler, even when the blending amount of short fibers is small, the occurrence and growth of cracks in the toothed belt (toothed transmission belt) can be effectively suppressed, and the tooth crack resistance of the toothed belt can be further improved. Thus the present invention is completed.

That is, the rubber toothed belt (toothed power-transmission belt) of the present invention includes:

a belt main body including a plurality of tooth portions provided at predetermined intervals along a longitudinal direction of the belt and including a first rubber composition, a back portion integrated with the tooth portions and including a second rubber composition, and a core wire embedded in the back portion in the longitudinal direction; and a tooth cloth covering surfaces of the tooth portions, in which the first rubber composition forming the tooth portions includes a composite polymer including a hydrogenated nitrile rubber and an unsaturated carboxylic acid metal salt in a mass ratio of 100/80 to 100/180, and includes, with respect to 100 parts by mass of the composite polymer, 3 parts by mass to 50 parts by mass (for example, 5 parts by mass to 40 parts by mass) of a zinc oxide, 3 parts by mass to 50 parts by mass (for example, 5 parts by mass to 40 parts by mass) of a non-reinforcing filler, 10 parts by mass or less (for example, 0 parts by mass to 8 parts by mass) of a reinforcing filler, 5 parts by mass or less (for example, 0.5 parts by mass to 3 parts by mass) of short fibers, and 1 part by mass to 5 parts by mass (for example, 2 parts by mass to 5 parts by mass of an organic peroxide having a theoretical active oxygen content of 9% or more) of an organic peroxide.

When such a rubber composition (first rubber composition) is used, the hardness and modulus of the tooth portion can be increased, and the occurrence and growth of cracks can be suppressed while suppressing deformation of the rubber. That is, by increasing the blending amount of zinc oxide, the heat aging resistance can be enhanced, and the occurrence and growth of cracks can be suppressed. Further, by reducing the blending amount of the reinforcing filler, the loss coefficient tan δ can be reduced, and heat generation due to deformation of the rubber can be suppressed, and thermal aging of the rubber composition and the tooth portion can be suppressed. Further, by increasing the blending amount of the non-reinforcing filler, the dispersibility of the blending agent such as the short fibers can be improved, the uniformity of the rubber composition or the tooth portion can be improved, and the occurrence and growth of cracks can be suppressed even when the blending amount of the short fibers is small. Furthermore, the blending amount of the short fibers can be reduced, and the occurrence of cracks starting from the interface between the short fibers and the polymer can be effectively suppressed.

The non-reinforcing filler (or inert filler) may be at least one selected from the group consisting of polyvalent metal carbonates (such as calcium carbonate and magnesium carbonate), polyvalent metal hydroxides (such as aluminum hydroxide), polyvalent metal sulfates (such as barium sulfate), and silicates (silicates containing polyvalent metals such as aluminum silicate, magnesium silicate, talc, clay, and mica). The non-reinforcing filler (or inert filler) is often calcium carbonate, for example. The reinforcing filler may be at least one selected from the group consisting of carbon black and silica.

Further, in the present invention, since the blending amount of the zinc oxide and the non-reinforcing filler is large, the short fibers can be effectively and uniformly dispersed. The mass ratio of the zinc oxide to the non-reinforcing filler may be the former/the latter=about 10/100 to 500/100 (for example, 25/100 to 150/100), and the mass ratio of the short fibers to the non-reinforcing filler may be the former/the latter=about 0/100 to 40/100 (for example, 5/100 to 25/100).

An adhesive component may be attached to at least a part of the surface of the short fibers. By adhering the adhesive component, the affinity and adhesive force between the short fibers and the polymer can be improved, and the occurrence of cracks starting from the interface between the short fibers and the polymer can be effectively suppressed. Further, the adhesive component may be resorcin-formalin-latex (RFL) or a cured product thereof. When such RFL is used as the adhesive component, in addition to having the intermediate property between the rigidity of the short fibers and the flexibility of the polymer, the RFL can strongly adhere the short fibers and the polymer, and the adhesive component can follow the deformation of the polymer, thereby effectively suppressing the occurrence of cracks.

The rubber composition may form a vulcanized rubber or crosslinked rubber (tooth portion) having a large storage elastic modulus (E') and a small loss coefficient (tan δ) by vulcanization. The storage elastic modulus (E') of the vulcanized rubber (or crosslinked rubber) may be about 400 MPa to 1000 MPa, and the loss coefficient (tan δ) may be about 0.05 to 0.15. By forming the tooth portion with the vulcanized rubber having a high storage elastic modulus and a low loss coefficient (dielectric loss), since the heat generation of the rubber due to the deformation can be suppressed while suppressing the deformation of the rubber, both the occurrence and growth of cracks can be suppressed, and the tooth crack resistance of the toothed belt can be significantly improved. When the blending amount of the reinforcing filler is increased in order to increase the storage elastic modulus, the loss coefficient increases, and thermal degradation of the rubber composition or the tooth portion due to heat generation is facilitated, and the tooth cracks cannot be effectively suppressed. In the present invention, by means of increasing the blending amount of the zinc oxide and the non-reinforcing filler while reducing the blending amount of the reinforcing filler, both the storage elastic modulus and the loss coefficient can be achieved within a preferred range, and the tooth crack can be effectively suppressed.

The present invention includes a rubber composition including a composite polymer including a hydrogenated nitrile rubber and an unsaturated carboxylic acid metal salt in a mass ratio of 100/80 to 100/180, and including, with respect to 100 parts by mass of the composite polymer, 3 parts by mass to 50 parts by mass of a zinc oxide, 3 parts by mass to 50 parts by mass of a non-reinforcing filler, 10 parts by mass or less of a reinforcing filler, 5 parts by mass or less of short fibers, and 1 part by mass to 5 parts by mass of an organic peroxide. The rubber composition is useful at least for forming the tooth portion or the like.

In the present specification, the term "reinforcing filler" means a powdery filler which is strongly bonded to a polymer and has a high reinforcing property, and does not include "short fibers". The "non-reinforcing filler" means a filler having a small interaction with the polymer and a low reinforcing property. The "composite polymer" means a mixture of hydrogenated nitrile rubber and an unsaturated carboxylic acid metal salt (a homogeneous mixture of hydrogenated nitrile rubber and an unsaturated carboxylic acid metal salt, a mixture in which an unsaturated carboxylic acid metal salt is dispersed in hydrogenated nitrile rubber, or an alloy of hydrogenated nitrile rubber and an unsaturated carboxylic acid metal salt), and a composite polymer (or rubber alloy) containing a hydrogenated nitrile rubber and an unsaturated carboxylic acid metal salt may be simply referred to as a polymer. The phrase "the tooth portion and the back portion are integrated" means that the tooth portion and the back portion do not peel off at the interface. In addition, the acrylic monomer and the methacrylic monomer may be collectively referred to as (meth) acrylic monomers. A numerical range "XX to YY" means a range including the numerical value "XX" and the numerical value "YY", that is, the numerical range is equal to a range of the numerical value "XX" or more and the numerical value "YY" or less.

Advantageous Effects of Invention

In the present invention, since the blending amount of the zinc oxide and the non-reinforcing filler is large, the hardness and modulus of the tooth portion can be increased to suppress the growth of cracks and also the occurrence of microcracking that causes the growth of cracks and thus the life (tooth crack resistance) of the toothed belt can be greatly improved. Therefore, even when the transmission power is increased, the life of the toothed belt can be extended, and the durability can be enhanced. Furthermore, even when the content of the short fibers is small, the tooth crack resistance of the toothed belt can be significantly improved.

BRIEF DESCRIPTION OF DRAWINGS

FIG. 1 is a partial cross-sectional perspective view showing an example of a rubber toothed belt of the present invention.

DESCRIPTION OF EMBODIMENTS

Hereinafter, an example of a rubber toothed belt of the present invention will be described in detail with reference to the accompanying drawings.

FIG. 1 is a partial cross-sectional perspective view showing an example of a rubber toothed belt of the present invention. The toothed belt 1 of this example includes a belt main body 2 having a plurality of tooth portions 3 formed at predetermined intervals along the longitudinal direction, a back portion 4, and a core wire 5, and a tooth cloth 7 covering the surface of the tooth portions 3 of the belt main body. Specifically, the toothed belt 1 includes a belt main body 2 in which a plurality of tooth portions 3 having a trapezoidal cross section are formed, and a tooth cloth (cover cloth) 7 that covers the surface of the tooth portions 3. The belt main body 2 includes the back portion 4 extending in the longitudinal direction (X direction), the plurality of tooth portions 3 formed so as to extend in the width direction (Y direction) at predetermined intervals along the longitudinal direction of the back portion, and a core wire 5 embedded along the longitudinal direction of the back portion 4.

Further, the rubber composition at least forming the tooth portions 3 may include short fibers 6. Similar to the core wire 5, the short fibers may be oriented in the longitudinal direction of the belt 1 (curved along the cross-sectional shape of the tooth portion 3 on the tooth cloth 7 side and oriented in a form substantially parallel to the core wire 5 or the back portion 4 on the core wire 5 side). The tooth cloth 7 may be formed of a woven fabric (twill weave canvas or the like) including warp yarns 7a extending in the width direction of the belt and weft yarns 7b extending in the longitudinal direction of the belt.

The toothed belt is not limited to the form or the structure shown in FIG. 1. For example, the toothed belt includes a belt main body having a plurality of tooth portions or projections formed at predetermined intervals along the longitudinal direction on at least one surface of the belt and a core wire embedded therein, and a tooth cloth (cover cloth) that covers the surface of the tooth portions of the belt main body or is laminated on the surface of the tooth portions of the belt main body. The plurality of tooth portions or projections are capable of meshing with the toothed pulley, and the cross-sectional shape of the tooth portion or the projection (cross-sectional shape in the longitudinal direction of the belt) is not limited to the trapezoid, and may be, for example, a semicircle, a semi-elliptical shape, a polygonal shape (triangle, quadrangle (rectangle or the like), or the like) depending on the form of the toothed pulley or the like. The interval between the tooth portions or the projections adjacent to each other in the longitudinal direction may be, for example, about 1 mm to 10 mm, preferably about 2 mm to 8 mm, depending on the form of the toothed pulley or the like. The short fibers may be randomly oriented with respect to the belt, but are usually primarily oriented in the longitudinal direction of the belt to effectively reinforce the belt main body. The extension direction of the warp yarns and the weft yarns of the tooth cloth is not particularly limited, for example, the warp yarns may extend diagonally with respect to the longitudinal direction of the belt, or the warp yarns may extend in the longitudinal direction of the belt and the weft yarn may extend in the width direction of the belt. Usually, to increase durability, the warp yarns extend in the width direction of the belt and the weft yarns extend in the longitudinal direction of the belt.

Hereinafter, each element of the toothed belt will be described while considering that the tooth portion and the projection have the same meaning.

(Belt Main Body (Tooth Portion and Back Portion))

Examples of the rubber component of the rubber composition forming the belt main body include a diene rubber (a natural rubber, an isoprene rubber, a butadiene rubber, a chloroprene rubber, a butyl rubber, a styrene-butadiene rubber (SBR), a vinylpyridine-styrene-butadiene rubber, an acrylonitrile-butadiene rubber (nitrile rubber: NBR), an acrylonitrile-chloroprene rubber, hydrogenated nitrile rubber (HNBR), or the like), an ethylene-α-olefin elastomer (an ethylene-propylene copolymer (EPM), an ethylene-propylene-diene ternary copolymer (EPDM), or the like), a chlorosulfonated polyethylene rubber (CSM), an alkylated chlorosulfonated polyethylene rubber (ACSM), an epichlorohydrin rubber, an acrylic rubber, a silicone rubber, a urethane rubber, a fluorine rubber, or the like. These rubber components may be carboxylated, such as carboxylated SBR, carboxylated NBR, or the like. These rubber components may be used alone or in combination of two or more thereof. The preferred rubber component is a highly heat-aging-resistant rubber, such as hydrogenated diene rubber (hydrogenated nitrile rubber (HNBR) or the like), a chlorosulfonated polyethylene (CSM), an alkylated chlorosulfonated polyethylene (ACSM); and in particularly is hydrogenated nitrile rubber (HNBR) which may be carboxylated (hereinafter, sometimes simply referred to as hydrogenated nitrile rubber including a carboxylated hydrogenated nitrile rubber). The proportion of the above-mentioned preferred rubber component in the rubber components is preferably 50 mass % or more (for example, about 80 mass % to 100 mass %), and particularly preferably 100 mass %. The hydrogenated nitrile rubber which may be carboxylated may be partially-hydrogenated nitrile rubber or fully-hydrogenated nitrile rubber. The hydrogenation ratio of the hydrogenated nitrile rubber which may be carboxylated may be selected from the range of about 50% to 100%, and may be about 70% to 100%.

The rubber component in the rubber composition forming at least the tooth portions (preferably both the tooth portions and the back portion) contains at least hydrogenated nitrile rubber which may be carboxylated, and the proportion of such hydrogenated nitrile rubber in the rubber component may be 80 mass % to 100 mass % (preferably 90 mass % to 100 mass %, particularly 100 mass %). An iodine value (unit: mg/100 mg) of the hydrogenated nitrile rubber may be, for example, about 5 to 60 (for example, 7 to 50), preferably 8 to 40 (for example, 8 to 35), and more preferably about 10 to 30.

The rubber composition forming at least the tooth portions contains a polymer or a rubber alloy (or a composite polymer) containing hydrogenated nitrile rubber and an unsaturated carboxylic acid metal salt. Such a polymer can increase at least the hardness and modulus of the tooth portions, suppress deformation of the rubber, and suppress the growth of the cracks.

Examples of the unsaturated carboxylic acid of the unsaturated carboxylic acid metal salt include monocarboxylic acids such as (meth) acrylic acid and crotonic acid, dicarboxylic acids such as maleic acid, fumaric acid, and itaconic acid, and monoalkyl esters of these dicarboxylic acids. These unsaturated carboxylic acids can be used alone or in combination of two or more thereof. A preferred unsaturated carboxylic acid is (meth) acrylic acid. Examples of the metal of the unsaturated carboxylic acid metal salt include polyvalent metals such as Group 2 elements of the Periodic Table (magnesium, calcium, or the like), Group 4 elements of the Periodic Table (titanium, zirconium, or the like), Group 8 to Group 14 elements of the Periodic Table (for example, iron, cobalt, nickel, copper, zinc, aluminum, tin, lead, or the like). These metals may be used alone or in combination of two or more thereof. Preferred metals are Group 2 elements of the Periodic Table (magnesium or the like), Group 12 elements of the Periodic Table (zinc or the like), or the like.

Preferred examples of the unsaturated carboxylic acid metal salt include zinc (meth) acrylate, magnesium (meth) acrylate, or the like. The unsaturated carboxylic acid metal salts can be used alone or in combination of two or more thereof.

The mass ratio between the hydrogenated nitrile rubber and the unsaturated carboxylic acid metal salt is the former/the latter=100/80 to 100/180 (for example, 100/85 to 100/175), and can be preferably selected from the range of about 100/90 to 100/175. In the present invention, since the blending amount of the zinc oxide and the non-reinforcing filler is large, even when the proportion of the unsaturated carboxylic acid metal salt is relatively small, the hardness and modulus of the rubber composition and the tooth portions can be improved and the tooth crack resistance of the toothed belt can be improved. Therefore, the mass ratio of the hydrogenated nitrile rubber and the unsaturated carboxylic acid metal salt may be, for example, the former/the latter=100/80 to 100/150, preferably 100/90 to 100/135 (for example, 100/95 to 100/130), and more preferably about 100/100 to 100/120. When the proportion of the unsaturated carboxylic acid metal salt to 100 parts by mass of the hydrogenated nitrile rubber is less than 80 parts by mass, the hardness and modulus of the rubber composition (or the tooth portions) are reduced, and when the proportion of the unsaturated carboxylic acid metal salt to 100 parts by mass of the hydrogenated nitrile rubber exceeds 180 parts by mass, the processability and bendability of the belt are reduced.

A commercially available product may be used as the composite polymer (rubber alloy) of the hydrogenated nitrile rubber and the unsaturated carboxylic acid metal salt, and the mass ratio of the hydrogenated nitrile rubber and the unsaturated carboxylic acid metal salt may be adjusted by mixing a commercially available composite polymer (rubber alloy) and commercially available hydrogenated nitrile rubber.

(Zinc Oxide)

In the rubber composition, zinc oxide functions not only as an anti-heat aging agent but also functions as a vulcanization accelerator. The average particle size of the zinc oxide may be, for example, about 0.01 μm to 3 μm (for example, 0.02 μm to 2.5 μm), preferably 0.05 μm to 2 μm (for example, 0.1 μm to 1.5 μm), particularly about 0.1 μm to 1 μm (for example, 0.3 μm to 1 μm). The average particle size of zinc oxide can be measured as a volume average particle size by using a laser diffraction type particle size distribution measuring device.

The proportion of zinc oxide to 100 parts by mass of the composite polymer may be about 3 parts by mass to 50 parts by mass (for example, 5 parts by mass to 40 parts by mass); may be preferably about 3 parts by mass to 35 parts by mass (for example, 5 parts by mass to 30 parts by mass); and may be about 3 parts by mass to 20 parts by mass (for example, 5 parts by mass to 15 parts by mass) and preferably about 4 parts by mass to 10 parts by mass. When the content of zinc oxide is too small, the heat aging resistance decreases, and when the content of zinc oxide is too large, the dispersibility of the blending agent such as short fibers may become poor. As zinc oxide, commercially available powdery zinc oxide can be used as a vulcanization accelerator for rubber.

In the present invention, by appropriately increasing the blending amount of zinc oxide, the heat aging resistance of the rubber composition and the tooth portions can be improved, and both the occurrence and the growth of the cracks can be suppressed. When the content of the reinforcing filler is reduced, the rubber composition is less likely to generate heat, but the heat generation cannot be avoided. Therefore, by increasing the content of zinc oxide, the heat aging resistance of the rubber composition and the tooth portions can be improved, and even when the rubber composition generates heat, the occurrence of the tooth crack can be suppressed.

(Filler)

Depending on the difference in the reinforcing property, the filler has a different influence on the loss coefficient tan δ and heat generation, and when the usage amount of the reinforcing filler having a high reinforcing property is increased, the loss coefficient tan δ increases and heat generation easily occurs. Thus, in the present invention, the filler is roughly classified into a non-reinforcing filler (or an inert filler or a first inorganic filler) and a reinforcing filler (second inorganic filler), and the toothed belt of the present invention includes at least a non-reinforcing filler (or an inert filler). As described above, although it is described in Patent Literature 1 that the powdery inorganic filler is blended at a proportion of 10 parts by mass or less with respect to 100 parts by mass of the hydrogenated nitrile rubber, carbon black and silica which are reinforcing fillers are exemplified as the powdery inorganic filler and the non-reinforcing filler is not described.

(Non-Reinforcing Filler (First Inorganic Filler))

Examples of the non-reinforcing filler (first inorganic filler) include polyvalent metal carbonates (such as calcium carbonate and magnesium carbonate), polyvalent metal hydroxides (such as aluminum hydroxide), polyvalent metal sulfates (such as barium sulfate), silicates (natural or synthetic silicates such as aluminum silicate, magnesium silicate, magnesium aluminum silicate in which a part of silicon is replaced with polyvalent metal atoms; or minerals containing silicate as the main component, such as silicate minerals such as clay containing aluminum silicate, talc and mica containing magnesium silicate), lithopone, silica sand, or the like. These non-reinforcing fillers may be used alone or in combination of two or more thereof. Preferred non-reinforcing fillers are at least one selected from calcium carbonate, magnesium carbonate, aluminum hydroxide, barium sulfate, silicates (silicates such as aluminum silicate, magnesium silicate, magnesium aluminum silicate, or silicate minerals (talc, clay, mica, or the like)). Further, the non-reinforcing filler preferably includes at least one selected from calcium carbonate, magnesium silicate, talc containing magnesium silicate, aluminum silicate, or a clay containing aluminum silicate; and particularly preferably includes calcium carbonate, from the viewpoint that the effect of improving the processability of the belt and the dispersibility of the blending agent is great and it is difficult to cause poor dispersion of the blending agent. As the non-reinforcing filler, a powdery filler commercially available as a rubber filler can be used.

The average particle size (average primary particle size) of the non-reinforcing filler (first inorganic filler) can be selected from the range of about 0.01 μm to 25 μm (for example, 0.2 μm to 20 μm), preferably about 0.5 μm to 17 μm (for example, 1 μm to 15 μm). The average particle size (average primary particle size) of the non-reinforcing filler (first inorganic filler) may be, for example, about 0.01 μm to 3 μm (for example, 0.02 μm to 2 μm), preferably about 0.05 μm to 1.5 μm (for example, 0.1 μm to 1 μm), or may be relatively large. For example, the average particle size (average primary particle size) of the non-reinforcing filler may be about 0.2 μm to 5 μm (for example, 0.3 μm to 3 μm), preferably about 0.5 μm to 2.5 μm (for example, about 1 μm to 2 μm). Depending on the type of the non-reinforcing filler, for example, magnesium silicate or a mineral thereof, the non-reinforcing filler may be crushed or smashed in the kneading process with the composite polymer or the like. The average particle size of the non-reinforcing filler having such crushing property or smashing property may be the average particle size before kneading with the composite polymer or the like. The non-reinforcing filler may generally have an average particle size in the above range (for example, 0.1 μm to 10 μm, preferably 0.5 μm to 5 μm, and more preferably 1 μm to 3 μm) in the tooth portions or the rubber composition thereof. The average particle size of the non-reinforcing filler may be measured as a volume average particle size by using a laser diffraction type particle size distribution measuring device. The average particle size of the nanometer-size filler may be calculated as an arithmetic mean particle size of an appropriate number of samples (for example, 50 samples) by image analysis of electron microscope photographs including scanning electron microscope photographs.

The proportion of the non-reinforcing filler (first inorganic filler) is 3 parts by mass to 50 parts by mass (for example, 5 parts by mass to 40 parts by mass), preferably 5 parts by mass to 30 parts by mass (for example, 6 parts by mass to 25 parts by mass), more preferably 7 parts by mass to 20 parts by mass (for example, 8 parts by mass to 15 parts by mass) with respect to 100 parts by mass of the composite polymer. When the content of the non-reinforcing filler is too small, there is a concern that the processability of the belt and the dispersibility of the blending agent may not be sufficiently improved. When the content of the non-reinforcing filler is too large, there is a concern that the dispersibility of the blending agent may become poor.

The total amount of the zinc oxide and the non-reinforcing filler may be about 6 parts by mass to 70 parts by mass (for example, 7 parts by mass to 50 parts by mass), preferably 8 parts by mass to 40 parts by mass (for example, 10 parts by mass to 30 parts by mass), more preferably about 10 parts by mass to 20 parts by mass (for example, 12 parts by mass to 18 parts by mass) with respect to 100 parts by mass of the composite polymer. By increasing the usage amount of the zinc oxide and the non-reinforcing filler, even when the belt includes short fibers, the short fibers can be uniformly dispersed in the kneading process, and the occurrence of cracks can be effectively prevented.

When the non-reinforcing filler (first inorganic filler) is used in a relatively large proportion, the dispersibility of the various blending agents (the zinc oxide, the reinforcing filler, the short fibers, or the like) in the rubber kneading can be improved, and the uniformity of the rubber composition can be increased, and the heat generation due to the deformation of the rubber can be suppressed without significantly increasing the loss coefficient tan δ. Therefore, both the occurrence and the growth of cracks can be suppressed, and the tooth crack resistance of the toothed belt can be greatly improved. In particular, although the blending amount of the short fibers is small, the occurrence of cracks starting from an interface between the short fibers and the polymer can be effectively suppressed.

As described above, the rubber composition includes at least a non-reinforcing filler (first inorganic filler) as the filler. The mass ratio of the zinc oxide to the non-reinforcing filler (first inorganic filler) may be that the former/the latter=about 10/100 to 500/100 (for example, 15/100 to 300/100), preferably about 20/100 to 200/100 (for example, 25/100 to 150/100), more preferably about 30/100 to 100/100 (for example, 30/100 to 80/100), and may be about 25/100 to 75/100 (for example, 40/100 to 60/100). When the proportion of the non-reinforcing filler to zinc oxide is too small, the hardness and modulus of the rubber composition is likely to decrease, and when the proportion of the non-reinforcing filler to zinc oxide is too large, poor dispersion of the blending agent may occur.

(Reinforcing Filler (Second Inorganic Filler))

Examples of the reinforcing filler (second inorganic filler) include carbon black and silica. These reinforcing fillers may be used alone or in combination of two or more thereof.

The average particle size (average primary particle size) of the carbon black may be, for example, about 5 nm to 200 nm (for example, 10 nm to 150 nm), preferably 15 nm to 120 nm (for example, 20 nm to 100 nm), and more preferably about 25 nm to 100 nm (for example, 30 nm to 80 nm). When the average particle size of the carbon black is too small, there is a concern that the loss coefficient tan δ of the rubber composition and the tooth portions may increase. When the average particle size of the carbon black is too large, there is a concern that the mechanical properties of the belt main body may deteriorate. The carbon black can be used alone or in combination. The carbon black having an average particle size of about 5 nm to 35 nm (for example, 10 nm to 30 nm) may have a strong chemical bonding force with the rubber component, and the loss coefficient tan δ of the rubber composition and the tooth portions may increase. Therefore, the average particle size of the carbon black may be about 40 nm to 100 nm (for example, about 50 nm to 80 nm).

An iodine adsorption amount of the carbon black may be, for example, about 5 mg/g to 200 mg/g (for example, 10 mg/g to 150 mg/g), preferably 12 mg/g to 130 mg/g (for example, 15 mg/g to 100 mg/g), and more preferably about 20 mg/g to 85 mg/g (for example, 20 mg/g to 80 mg/g). In order to reduce the loss coefficient tan δ of the rubber composition and the tooth portions, the iodine adsorption amount of the carbon black is preferably small, and may be, for example, about 10 mg/g to 50 mg/g (for example, 15 mg/g to 40 mg/g).

Silica includes dry silica, wet silica, surface-treated silica, or the like. The silica can also be classified into, for example, dry process white carbon, wet process white carbon, colloidal silica, precipitated silica, or the like by a manufacturing method. These silicas may be used alone or in combination of two or more thereof. Among these silicas, silica having a surface silanol group (silicic anhydride, hydrous silicic acid) is preferred, and a hydrous silicic acid having many surface silanol groups has a strong chemical bonding force with the rubber component.

The average particle size (average primary particle size) of the silica may be, for example, about 1 nm to 500 nm (for example, 3 nm to 300 nm), preferably about 5 nm to 100 nm (for example, 10 nm to 50 nm). When the particle size of the silica is too large, there is a concern that the reinforcing property of the belt main body may decrease. When the particle size of the silica is too small, there is a concern that the loss coefficient tan δ of the rubber composition and the tooth portions is likely to increase, which may make it difficult to uniformly disperse the blending agent.

The nitrogen adsorption specific surface area by the BET method of silica may be, for example, about 50 m$^2$/g to 400 m$^2$/g (for example, 70 m$^2$/g to 300 m$^2$/g), preferably about 100 m$^2$/g to 250 m$^2$/g (for example, 150 m$^2$/g to 200 m$^2$/g). When the specific surface area is too large, there is a concern that the loss coefficient tan δ of the rubber composition and the tooth portions may increase, and it may be difficult to uniformly disperse the blending agent. When the specific surface area is too small, there is a concern that the reinforcing property of the rubber body may decrease.

As the reinforcing filler, a commercially available filler as a reinforcing agent for rubber can be used. The average particle size of the reinforcing filler can be calculated as an arithmetic average particle size of an appropriate number of samples (for example, 50 samples) by image analysis of electron microscope photographs including scanning electron microscope photographs.

The proportion of the reinforcing filler to 100 parts by mass of the composite polymer is 10 parts by mass or less (for example, 0 parts by mass to 10 parts by mass), preferably 0 parts by mass to 8 parts by mass (for example, 0.5 parts by mass to 7 parts by mass), and more preferably about 0 parts by mass to 5 parts by mass (for example, 1 part by mass to 3 parts by mass). When the blending amount of the reinforcing filler is more than 10 parts by mass, there is a concern that the loss coefficient tan δ increases, and the tooth cracks may be likely to occur due to the heat aging of the rubber composition. In contrast, by reducing the content of the reinforcing filler, the loss coefficient tan δ of the rubber composition and the tooth portions can be reduced, heat generation due to deformation of the rubber can be suppressed, heat aging of the rubber composition and the tooth portions can be suppressed, and both the occurrence and the growth of the cracks can be suppressed.

The reinforcing filler is usually blended in a large amount (for example, about 30 parts by mass to 60 parts by mass with respect to 100 parts by mass of rubber) in order to increase the hardness and modulus of the rubber composition. However, in the present invention, since the hydrogenated nitrile rubber including an unsaturated carboxylic acid metal salt in a predetermined amount is used, a belt having sufficient hardness and modulus can be obtained without using a reinforcing filler. Thus, in the present invention, the reinforcing filler may serve as a colorant for coloring the belt.

The mass ratio of the non-reinforcing filler (first inorganic filler) and the reinforcing filler (second inorganic filler) may be selected from, for example, a range of the former/the latter=about 100/0 to 100/100, and generally may be about 100/0 to 100/70 (for example, 100/0 to 100/50), and preferably about 100/0 to 100/30 (for example, 100/0 to 100/20).

(Short Fibers)

Examples of the short fibers include: synthetic fibers such as polyolefin fibers (such as a polyethylene fiber or a polypropylene fiber), polyamide fibers (such as a polyamide 6 fiber, a polyamide 66 fiber, a polyamide 46 fiber, or an aramid fiber), polyester fibers (such as polyalkylene arylate fibers (for example, C$_{2-4}$ alkylene C$_{8-14}$ arylate fibers such as a polyethylene terephthalate (PET) fiber, a polytrimethylene terephthalate (PTT) fiber, a polybutylene terephthalate (PBT) fiber, or a polyethylene naphthalate (PEN) fiber); completely aromatic polyester fibers such as polyarylate fibers or liquid crystal polyester fibers), vinylon fibers, polyvinyl alcohol fibers, or polyparaphenylene benzobisoxazole (PBO) fibers; natural fibers such as cotton, hemp or wool, regenerated cellulose fibers such as rayon, cellulose ester fiber, or the like; and inorganic fibers such as carbon fibers or glass fibers. These short fibers can be used alone or in combination of two or more thereof. Preferred short fibers are polyamide fibers (such as aramid fibers), polyalkylene arylate fibers (PET fibers, PEN fibers, or the like), carbon fibers, or the like.

The average fiber diameter of the short fibers may be, for example, about 1 μm to 100 μm (for example, 3 μm to 70 μm), preferably 5 μm to 50 μm (for example, 7 μm to 30 μm), more preferably about 10 μm to 25 μm (for example, 12 μm to 20 μm). The average fiber length of the short fibers may be, for example, about 0.3 mm to 10 mm (for example, 0.5 mm to 7 mm), preferably about 1 mm to 5 mm (for example, about 2 mm to 4 mm). When the average fiber diameter of the short fibers is too small or the average fiber length of the short fibers is too long, there is a concern that the short fibers may not be uniformly dispersed. When the average fiber diameter of the short fibers is too large or the average fiber length of the short fibers is too short, there is a concern that the mechanical properties of the belt main body may deteriorate.

When the short fibers are added, the hardness and modulus of the rubber composition can be increased, deformation of the rubber (or the tooth portions) can be suppressed, and the growth of the cracks can be suppressed. On the other hand, microcracking is likely to occur at the interface between the polymer and the short fibers, and thus it is not preferable to blend a lot of short fibers from the viewpoint of preventing the occurrence of the cracks. In addition, when the blending amount of the short fibers is small, there is a demerit that the rubber (or the tooth portions) is likely to be deformed and cracks easily grow. In the present invention, although the blending amount of the short fibers is small, deformation of the rubber (or the tooth portions) can be suppressed, the occurrence of cracks at the interface between the short fibers and the polymer can be effectively prevented, and thus the occurrence of the tooth cracks can be prevented by increasing the blending amount of the zinc oxide and the non-reinforcing filler.

The proportion of the short fibers is 5 parts by mass or less (0 to 5 parts by mass) with respect to 100 parts by mass of the composite polymer, preferably 0 parts by mass to 4 parts by mass (for example, 0.5 parts by mass to 3 parts by mass), more preferably 0 parts by mass to 2.7 parts by mass (for example, 0.5 parts by mass to 2.7 parts by mass, or 0.7 parts by mass to 2.5 parts by mass). Further, in the present invention, since high tooth crack resistance can be realized even when the blending amount of short fibers is small, the proportion of the short fibers may be, for example, less than 3 parts by mass (for example, 0 parts by mass to 2.9 parts by mass), preferably about 0.3 parts by mass to 2.8 parts by mass (for example, 0.5 parts by mass to 2.5 parts by mass), more preferably about 0.7 parts by mass to 2 parts by mass (for example, 0.8 parts by mass to 1.5 parts by mass) with respect to 100 parts by mass of the composite polymer. When the blending amount of the short fibers is too large, the cracks are likely to occur in the rubber composition, and the tooth crack resistance cannot be improved.

As described above, by using the non-reinforcing filler (first inorganic filler) and the short fibers in combination, the short fibers can be effectively and uniformly dispersed, the occurrence of cracks can be prevented, and thus the tooth crack resistance can be improved. The mass ratio of the short fibers and the non-reinforcing filler (first inorganic filler) may be, for example, the former/the latter=about 0/100 to 40/100 (for example, 2/100 to 30/100), preferably 5/100 to 25/100 (for example, 6/100 to 20/100), or may be about 5/100 to 15/100 (for example, 7/100 to 13/100). When the proportion of the non-reinforcing filler is too small, the dispersibility of the short fibers cannot be improved and cracks are likely to occur in the rubber composition. When the proportion of the non-reinforcing filler is too large, the non-reinforcing filler may become poor in dispersion.

In order to improve the dispersibility and adhesiveness of the short fibers in the rubber composition, the short fibers are preferably subjected to a conventional adhesion treatment (or surface treatment) to adhere the adhesive component to at least a part of the surface of the short fibers. The adhesiveness between the short fibers and the polymer is improved by such an adhesion treatment, and the occurrence of cracks starting from the interface between the short fibers and the polymer can be further effectively suppressed.

Examples of the adhesion treatment include treatment with an adhesive component such as an epoxy compound (or an epoxy resin), a polyisocyanate, a silane coupling agent, resorcin-formalin-latex (RFL), or the like, and the adhesion treatment can be performed by treating (for example, dipping) the short fibers with a treatment liquid (solution or dispersion) containing such an adhesive component and drying them. The resorcin-formalin-latex (RFL) treatment liquid or the RFL treatment liquid containing a polyisocyanate compound may be, for example, a latex-based adhesive containing a resorcin-formalin resin, a polyisocyanate compound, or the like. The latex rubber may be a rubber having a functional group such as a carboxyl group. The preferred adhesive component is RFL and may contain at least a condensate (or initial condensate) of resorcinol and formaldehyde and a latex (such as a vinyl pyridine latex such as HNBR latex, styrene-butadiene copolymer latex, vinylpyridine-styrene-butadiene copolymer latex). In addition, the RFL treatment liquid may contain at least one of co-crosslinking agent among an aqueous dispersion of a sulfur compound (such as sulfur, tetramethylthiuram disulfide), a quinone oxime compound (such as p-quinonedioxime), a poly (meth) acrylate compound (such as alkane polyol poly (meth) acrylates such as ethylene glycol dimethacrylate, butanediol dimethacrylate, trimethylolpropane trimethacrylate, triallyl (iso) cyanurate (i.e., triallyl cyanurate and triallyl isocyanurate)), bismaleimide compounds (such as N, N'-m-phenylene bismaleimide, N, N'-(4,4'-diphenylmethane bismaleimide)).

The resorcin-formalin-latex (RFL) as the adhesive component has an intermediate property between the rigidity of the short fibers and the flexibility of the polymer, so that the adhesive component can be caused to follow the deformation of the polymer while strongly adhering the short fibers and the polymer, and the occurrence of cracks can be effectively suppressed.

The short fibers can be oriented in a predetermined direction in a process of preparing an unvulcanized rubber sheet by rolling the rubber composition kneaded with a Banbury mixer or the like using a roll, a calendar, or the like.

(Organic Peroxide)

The rubber composition further includes an organic peroxide. The type of the organic peroxide is not particularly limited, and examples thereof include di-t-butyl peroxide, dicumyl peroxide, t-butyl cumyl peroxide, 1,1-t-butylperoxy-3,3,5-trimethylcyclohexane, 1,3-bis (t-butylperoxyisopropyl) benzene, 2,5-dimethyl-2,5-di (t-butylperoxy) hexane, 2,5-dimethyl-2,5-di (t-butylperoxy) hexyne-3,1,3-bis (t-butylperoxy-di-isopropyl) benzene, 2,5-dimethyl-2,5-di (benzoylperoxy) hexane, t-butyl peroxybenzoate, t-butylperoxy-2-ethyl-hexyl carbonate, or the like. These organic peroxides can be used alone or in combination of two or more thereof.

When an organic peroxide having a high theoretical active oxygen content is used, the hardness and modulus of the rubber composition can be increased, and deformation of the rubber can be suppressed, thereby suppressing the growth of cracks. The theoretical active oxygen content represents the concentration of the peroxide bond in the molecule of the organic peroxide, and is obtained by the following formula.

Theoretical active oxygen content(%)=(number of peroxide bonds×16/organic peroxide molecular weight)×100

The theoretical active oxygen content can be rephrased as the ability to crosslink the rubber composition, and the larger the theoretical active oxygen content, the more the crosslinking is promoted, and the hardness and modulus of the rubber composition can be increased. Therefore, the preferred theoretical active oxygen content of the organic peroxide is 9% or more (9% to 18%), preferably 9% to 15%, and more preferably about 9% to 12%. When an organic peroxide having a low theoretical active oxygen content is used, the hardness and modulus of the rubber composition are reduced.

Examples of such an organic peroxide having a theoretical active oxygen content of 9% or more include 2,5-dimethyl-2,5-di (t-butyl peroxy) hexane, 2,5-dimethyl-2,5-di (t-butyl peroxy) hexyne-3,1,3-bis (t-butyl peroxy isopropyl) benzene, or the like.

The usage amount of the organic peroxide can be selected from the range of about 0.2 parts by mass to 10 parts by mass (for example, 0.5 parts by mass to 7 parts by mass) with respect to 100 parts by mass of the composite polymer. The usage amount of the organic peroxide with respect to 100 parts by mass of the composite polymer is usually 1 part by mass to 5 parts by mass (for example, 1.5 parts by mass to 4.5 parts by mass), preferably about 2 parts by mass to 4 parts by mass (for example, 2 parts by mass to 3 parts by mass) and may be about 2 parts by mass to 5 parts by mass. When the blending amount of the organic peroxide is too small, the hardness and modulus of the rubber composition decrease, and when the blending amount of the organic peroxide is too large, the flexibility of the belt decreases.

(Additive)

The rubber composition may further include a conventional additive. Examples of the additive include co-crosslinking agents (such as alkane polyol poly (meth) acrylates such as ethylene glycol dimethacrylate, butanediol dimethacrylate, trimethylolpropane trimethacrylate, pentaeristril tetramethacrylate; triallyl (iso) cyanurate; bismaleimide such as N, N'-m-phenylene bismaleimide, N, N'-(4,4'-diphenylmethane bismaleimide)), vulcanization aids or vulcanization accelerators (such as a thiuram-based accelerator), vulcanization accelerating aids (such as a higher fatty acid such as stearic acid and lauric acid), vulcanization retarders, metal oxides (such as magnesium oxide, calcium oxide, barium oxide, iron oxide, copper oxide, titanium oxide, aluminum oxide, and magnesium oxide), softeners (for example, paraffin oils, oils such as naphthenic oils, etc.), processing agents or processing aids (such as stearic acid metal salt, wax, paraffin, and fatty acid amide), anti-aging agents (such as an antioxidant, an anti-heat aging agent, a bending crack inhibitor, an ozone deterioration inhibitors), colorants, tackifiers, plasticizers, coupling agents (such as silane coupling agents), stabilizers (such as UV absorbers and heat stabilizers), flame retardants, antistatic agents, or the like. The rubber composition may contain an adhesiveness improving agent (resorcin-formaldehyde co-condensate, amino resin, or the like), as necessary. These additives may be used alone or in combination of two or more thereof.

The total proportion of the additives may be, for example, about 1 part by mass to 100 parts by mass, preferably 3 parts by mass to 50 parts by mass, and more preferably about 5 parts by mass to 20 parts by mass with respect to 100 parts by mass of the composite polymer. For example, with respect to 100 parts by mass of the composite polymer, the proportion of the vulcanization accelerating aid (such as stearic acid) may be about 0.1 parts by mass to 5 parts by mass (for example, 0.5 parts by mass to 3 parts by mass), the proportion of metal oxides excluding zinc oxide may be about 0 parts by mass to 20 parts by mass (for example, 1 part by mass to 10 parts by mass), the proportion of anti-aging agent may be about 0.5 parts by mass to 10 parts by mass (for example, 1 part by mass to 5 parts by mass), and the proportion of the processing (aid) agent may be about 0 part by mass to 5 parts by mass (for example, 0.5 parts by mass to 3 parts by mass).

(Storage Elastic Modulus (E'), Loss Elastic Modulus (E"), and Loss Coefficient (Tan δ))

The rubber composition (vulcanized rubber composition) is useful for forming a formed body (vulcanized or crosslinked formed body) having a high storage elastic modulus (E'), a small loss elastic modulus (E") and a small loss coefficient (tan δ). That is, the storage elastic modulus (E'), the loss elastic modulus (E"), and the loss coefficient (tan δ) are physical quantities describing the dynamic viscoelasticity, and can be obtained from a gap of displacement and velocity with respect to an input wave as stress when sinusoidal waveform displacement is applied to an object. The storage elastic modulus (E') is a component stored in the object as energy when stress is applied to the object, and the loss elastic modulus (E") represents a component in which the applied stress is converted into heat or the like and diffused to the outside. Therefore, as the storage elastic modulus (E') increases, the object is less likely to be deformed, and the growth of cracks in the rubber composition can be suppressed even when strong stress is applied. In addition, the loss coefficient (tan δ) is the ratio of the storage elastic modulus to the loss elastic modulus (E"/E') and can be used as an index of heat generation when the rubber composition is deformed, and the smaller the loss coefficient (tan δ) is, the more the heat generation can be suppressed at small value, and thus the thermal degradation of the rubber composition can be suppressed.

The storage elastic modulus (E') of the vulcanized or crosslinked product formed from the rubber composition may be, for example, about 400 MPa to 1000 MPa (for example, 450 MPa to 970 MPa), preferably about 500 MPa to 950 MPa (for example, 600 MPa to 900 MPa), and more preferably about 650 MPa to 850 MPa (for example, 700 MPa to 800 MPa), and generally often about 750 MPa to 850 MPa (for example, 750 MPa to 800 MPa). The loss coefficient (tan δ) of the vulcanized or crosslinked product can be selected from the range of about 0.05 to 0.17 (for example, 0.05 to 0.15), and may be, for example, about 0.07 to 0.15 (for example, 0.1 to 0.14), preferably about 0.1 to 0.145 (for example, 0.11 to 0.14). When the storage elastic modulus (E') is too small, there is a concern that the rubber composition may be likely to be deformed and tooth crack may be likely to occur. When the storage elastic modulus (E') is too large, there is a concern that the rubber composition may become too rigid, resulting in poor flexibility and interference with the pulley tooth groove. In addition, when the loss coefficient (tan δ) is too large, there is a concern that heat generation increases due to deformation, which may accelerate heat aging of the rubber composition. When the loss coefficient (tan δ) is too small, it is difficult to achieve compatibility with other properties such as hardness and modulus. In the present invention, since the storage elastic modulus can be increased, deformation of the rubber can be suppressed, the loss coefficient can be reduced, and heat generation due to deformation can be suppressed. Therefore, both the occurrence and the growth of cracks can be suppressed, and the tooth crack resistance can be significantly improved. The storage elastic modulus (E'), the loss elastic modulus (E"), and the loss coefficient (tan δ) can be measured at a temperature of 55° C., a static displacement of 0.6 mm, a dynamic displacement (stroke) of 0.1 mm, and a frequency of 30 Hz using a constant strain flexometer tester specified in JIS K6265 (2018).

In order to increase the storage elastic modulus of the rubber composition, it is effective to increase the blending amount of the reinforcing filler, but the loss coefficient increases, thermal degradation of the rubber composition due to heat generation is promoted, and the tooth crack cannot be effectively suppressed. In the present invention, as described above, even when the amount of reinforcing filler is small, both the storage elastic modulus and the loss coefficient can be achieved in a preferred range by the zinc oxide and the non-reinforcing filler, thereby effectively suppressing the tooth crack resistance.

The hardness of the vulcanized or crosslinked product formed from the rubber composition may be, for example, a JIS-A hardness of about 95 degrees to 99 degrees, preferably about 96 degrees to 98 degrees (for example, 97 degrees to 98 degrees). The vulcanized or crosslinked product formed from the rubber composition at 20% elongation may have a modulus of at least 20 MPa or more (for example, about 20 MPa to 50 MPa, preferably about 25 MPa to 40 MPa). Here, the JIS-A hardness is a hardness in accordance with JIS K6253 (2012), and the hardness of the vulcanized or crosslinked product formed from the rubber composition is the hardness of the tooth portions 3 measured using the type A durometer.

The rubber compositions that form the tooth portions 3 and the back portion 4 may be formed of different rubber compositions or may be formed of the same rubber composition as long as the adhesion between the tooth portions 3 and the back portion 4 is not impaired. Typically, the tooth portions 3 and the back portion 4 often include rubbers or polymers of the same group (for example, different types of rubbers belonging to hydrogenated nitrile rubbers; rubbers having different contents of hydrogenated nitrile rubbers; polymers having different proportions of hydrogenated nitrile rubbers and unsaturated carboxylic acid metal salts, or the like) or rubber components of the same kind (for example, hydrogenated nitrile rubbers of the same kind; polymers of the same kind; or the like).

The tooth portions 3 and the back portion 4 are firmly joined without peeling at the interface. Normally, the rubber composition forming the tooth portions and the rubber composition forming the back portion are joined or co-vulcanized, and in the case where the tooth portions and the back portion are separated, the interface between the tooth portions and the back portion is likely to undergo cohesive failure.

(Core Wire)

Examples of the fibers forming the core wire include high elastic modulus fibers, for example, polyester fibers such as PBO fibers, polyarylate fibers, PET fibers, and PEN fibers, polyamide fibers such as aramid fibers, carbon fibers, or the like. These fibers may be used alone or in combination of two or more thereof. Preferred fibers are aramid fibers, carbon fibers, or the like.

In order to increase the tensile strength of toothed belt, these fibers can typically be used as raw yarns in the form of multifilament yarn (for example, multifilament yarn including about 1000 to 50,000 of monofilament yarns, preferably about 5,000 to 20,000 of monofilament yarns). The average fineness of the monofilament yarns may be, for example, about 0.1 dtex to 5 dtex, preferably about 0.3 dtex to 3 dtex, and more preferably about 0.5 dtex to 1 dtex. The core wire is often used as a cord, for example a twisted cord (twisted yarn) in which these multifilament yarns are used as core yarn (non-twisted yarn, preferably primary twist yarn) and finally twisted in a predetermined direction (for example, in the same direction as or opposite direction to the primary twist yarns). The average diameter (average wire diameter) of the core yarns may be, for example, about 0.2 mm to 1 mm, preferably about 0.3 mm to 0.8 mm, more preferably about 0.4 mm to 0.7 mm, and the average diameter (average wire diameter) of the cords (or core wires) may be, for example, 0.3 mm to 1.5 mm, preferably 0.5 mm to 1.3 mm, and more preferably about 0.7 mm to 1.2 mm.

The core wire pitch may be larger than the core wire diameter according to the core wire diameter, and may be, for example, 0.5 mm to 2 mm, preferably 0.7 mm to 1.7 mm, and more preferably about 0.8 mm to 1.5 mm (Tooth Cloth (Cover Cloth))

The tooth cloth (cover cloth) covering the surface of the tooth portions is not limited to the sailcloth of twill weave texture but may be formed of fabric such as a woven fabric, a knitted fabric, a non-woven fabric, or the like, but the tooth cloth (cover sailcloth) is usually a woven fabric (sailcloth) in many cases. The weave texture of the woven fabric is not particularly limited as long as the warp and the weft intersect regularly in a vertical and horizontal direction, and may be any of plain weave, twill weave (or oblique weave), satin weave (satin), or the like, and may be a weave texture combining these textures. Preferred woven fabrics have a twill weave and a satin weave.

Examples of the fibers forming the weft and the warp of the tooth cloth (cover cloth) include polyphenylene ether fibers, polyetheretherketone fibers, polyethersulfone fibers, polyurethane fibers, or the like in addition to the fibers similar to the short fibers. These fibers may be used alone or in combination of two or more thereof. Among these fibers, organic fibers are widely used, and cellulose fibers such as cotton and rayon, polyester fibers (such as PET fibers), polyamide fibers (aliphatic polyamide fibers such as polyamide 66 fibers, aramid fibers, or the like), PBO fibers, or the like are preferred. It is also preferable to use a composite yarn of these fibers and elastic yarns having elasticity (for example, a stretchable polyurethane elastic yarn such as a spandex formed of polyurethane, and a processed yarn obtained by elastic processing (for example, woolly processing, winding processing, or the like).

The form of the warp yarn and the weft yarn is not particularly limited, and may be a monofilament yarn which is a single long fiber, a multifilament yarn in which filaments (long fibers) are aligned or twisted, a spun yarn (spun yarn) obtained by twisting short fibers, and the multifilament yarn or the spun yarn may be a blended twisted yarn or a union yarn using a plurality of types of fibers. The weft yarn preferably contains the elastic yarn having elasticity, and in many cases, the warp yarn does not usually contain elastic yarn from the viewpoint of the weaving property. In order to ensure stretchability of the cover cloth in the belt longitudinal direction, it is preferable that the warp yarn of the woven fabric extends in the belt width direction, and the weft yarn extends in the belt longitudinal direction.

The average diameter of the fibers (or yarns) may be, for example, about 1 μm to 100 μm (for example, 3 μm to 50 μm), preferably about 5 μm to 30 μm (for example, 7 μm to 25 μm). For the average fiber diameter (thickness) of the yarns (twisted yarns), the weft yarn may be, for example, about 100 dtex to 1000 dtex (for example, 300 dtex to 700 dtex), and the warp may be, for example, about 50 dtex to 500 dtex (for example, about 100 dtex to 300 dtex). The density (pieces/cm) of the weft yarns may be, for example, about 5 to 50 (for example, 10 to 30), and the density (pieces/cm) of the warp yarns may be, for example, about 10 to 300 (for example, 20 to 100).

The woven fabric may have a multiple woven structure (such as a double woven structure), and at least a part of the weft yarns may be formed of a low friction coefficient fiber (or a low-friction fiber) such as a fluorine resin-containing fiber (such as a composite yarn containing a fiber formed of a fluorine resin such as polytetrafluoroethylene (PTFE)) located on the surface side of the tooth cloth in the woven structure including the warp yarns and the weft yarns. For example, the warp yarns is formed of a polyamide fiber such as nylon 66, polyester fiber, or the like, and the weft yarn is formed of a fiber formed of the fluororesin alone; a composite yarn of a fiber formed of the fluororesin and a second fiber such as polyamide fiber or polyurethane fiber; or a composite yarn of this composite yarn and second composite yarn formed of the plurality of the second fibers. In such a form of a tooth cloth, friction at meshing between the tooth cloth and the toothed pulley can be reduced, and sound generation can be suppressed.

The thickness of the tooth cloth (cover cloth) may be, for example, about 0.3 mm to 1.5 mm, preferably about 0.5 mm to 1.2 mm.

In order to increase the adhesiveness between the belt main body (the tooth portions and the back portion) and the tooth cloth (cover cloth), the tooth cloth (cover cloth) may be subjected to an adhesion treatment. Examples of the adhesion treatment include a method of immersing the tooth cloth (cover cloth) in an RFL treatment liquid and then heating and drying the tooth cloth; a method of treating with epoxy compound or isocyanate compound; a method of obtaining a mucilage by dissolving a rubber composition in an organic solvent, immersing the tooth cloth (cover cloth) in the mucilage, and then heating and drying the tooth cloth; a method combining these treatment methods; or the like. These methods can be performed alone or in combination, and the processing order and the number of times of processing are not limited. For example, after the pretreatment with an epoxy compound or an isocyanate compound, the tooth cloth may be dipped in an RFL treatment liquid and then heated and dried.

(Method for Preparing Toothed Belt)

A rubber toothed belt (toothed power transmission belt) of the present invention can be prepared by a conventional method. For example, in the toothed belt 1 shown in FIG. 1, a cover cloth (sailcloth) for forming the tooth cloth 7 is wound around a cylindrical forming mold (mold or forming mold) in which uneven stripes corresponding to the tooth portions 3 are formed; a cord for forming the core wire 5 is spirally wound around a cylindrical mold around which a cover cloth is wound at a predetermined pitch (a predetermined pitch with respect to the axial direction of the cylindrical mold); and an unvulcanized rubber sheet for forming the back portion 4 and the tooth portions 3 is wound thereon to form an unvulcanized sleeve (unvulcanized laminate). Further, the cylindrical mold around which the unvulcanized sleeve is wound is transferred into a vulcanizer, heated and pressurized, so that the rubber sheet is press-fitted into a mold groove (uneven stripe) to form the tooth portions 3 together with vulcanization. Then, the toothed belt 1 can be manufactured by cutting the formed body in the form of a vulcanized or crosslinked sleeve with a predetermined width.

The toothed belt 1 may be prepared by a preforming method. That is, first, the cover cloth 7 and the unvulcanized rubber sheet are sequentially stacked on a planar or flat mold having a tooth form, heated to a temperature of a degree of softening the rubber (for example, about 70° C. to 90° C.) and pressurized, and the rubber and the cover cloth 7 are pressed into the tooth form of the mold. By this heating and pressurizing process, the softened rubber flows into the tooth form while stretching the cover cloth 7 by pressurization, and a sheet-shaped preformed body having a cover cloth 7 and a preformed tooth portion corresponding to the tooth portion 3 are prepared. The preformed body is separated from the planar mold, cut to a predetermined length corresponding to the belt length, and then the preformed body having a predetermined length is wound around a cylindrical mold; the cord for forming the core wire is spirally spun on the wound preformed body; the unvulcanized rubber sheet for forming the back portion 4 is wound on a preformed body on which the cord is spun, and then vulcanized in a vulcanizer by heating and pressurizing; the vulcanized or crosslinked sleeve-shaped formed product is cut to a predetermined width; and thus the toothed belt 1 is obtained. In this preforming method, since the cover cloth 7 and the tooth portions 3 are formed in advance before vulcanization, it is not necessary to flow or extrude the unvulcanized rubber constituting the back portion 4 from spaces among the cords (core wires) 5 to the inside (tooth portions 3 side) and stretch the cover cloth 7 along the uneven stripes to form the tooth portions 3 in the vulcanization process. Therefore, it is possible to narrow the distance (pitch) between the core wires.

EXAMPLES

Hereinafter, the present invention will be described in more detail based on Examples, but the present invention is not limited to these Examples. Unless otherwise specified, "parts" and "%" are based on mass. Raw materials used in Examples and measurement methods or evaluation methods for each physical property are shown below.

(Rubber Composition)

Composite polymer 1: "Zeoforte ZSC2295CX" manufactured by Nippon Zeon Corporation, HNBR:unsaturated carboxylic acid metal salt=100:110, an iodine value of base HNBR of 28 mg/100 mg Composite polymer 2: "Zeoforte ZSC2298L" manufactured by Nippon Zeon Corporation, HNBR:unsaturated carboxylic acid metal salt=100:170, an iodine value of base HNBR of 28 mg/100 mg HNBR: "Zetpol 2010" manufactured by Nippon Zeon Corporation, an iodine value of 11 mg/100 mg Aramid short fibers: "Cornex" manufactured by Teijin Limited, a fiber length of 3 mm, a fiber diameter of 14 µm (RFL-treated short fibers were prepared by spreading the raw yarns and immersing it in an RFL treatment solution containing HNBR latex, and then cutting after drying)

Carbon Black SRF: "Seast S" manufactured by Tokai Carbon Co., Ltd., an average particle size of 66 nm, an iodine adsorption amount of 26 mg/g Silica: "Ultrasil VN-3" manufactured by Evonik Degussa Japan Co., Ltd., a specific surface area of 155 $m^2$/g to 195 $m^2$/g Zinc oxide: "Zinc oxide second grade" manufactured by Sakai Chemical Industry Co., Ltd., an average particle size of 0.55 µm Anti-aging agent: p, p'-dioctyldiphenylamine ("Nonflex OD3" manufactured by Seiko Kagaku Co., Ltd.)

Calcium carbonate: "Super #1500" manufactured by Maruo Calcium Co., Ltd., an average particle size of 1.5 µm Aluminum silicate: "Catalpo" manufactured by Sanyo Clay Industry Co., Ltd., an average particle size of 10 µm Magnesium silicate: "Talc 80" manufactured by Sanyo Clay Industry Co., Ltd., an average particle size of 15 µm Organic peroxide: 1,3-bis (t-butylperoxyisopropyl) benzene, a theoretical active oxygen content of 9.45%

(Tooth Cloth or Sailcloth)

A sailcloth of twill weave (double weave) texture using nylon 66 fibers as the warp yarns and a composite yarn of PTFE fibers and polyurethane fibers and a composite yarn of nylon 66 fibers and polyurethane fibers as the weft yarns.

(Core Wire)

Three pieces of the raw yarns of an aramid fiber of 1670 dtex were primarily twisted and then six pieces of the primarily twist yarns were bundled and finally twisted in the same direction as the primary twist to obtain a twisted cord.

(Preparation of Belt)

A toothed belt was prepared by using a preforming method. That is, the sailcloth and the unvulcanized rubber sheet were stacked on a toothed planar mold for preparation of a preformed body, heated to a temperature of about 80° C. and pressurized, and the rubber and sailcloth were pressed to prepare a preformed body having a fabric and a tooth portion. This preformed body was wound around a cylindrical mold for preparation of a belt, and then the core wire was spirally wound at a predetermined pitch with a predetermined tension. An unvulcanized rubber sheet (unvulcanized rubber sheet having the same composition as the above unvulcanized rubber sheet) for forming a back portion was wound on the core wire, and was put into a vulcanizer and vulcanized under pressure at 165° C. for 30 minutes. After vulcanization, the back surface of the belt was polished to a certain thickness and then the belt was cut to a predetermined width to obtain a toothed belt. Tables 1 to 3 show the composition of the rubber composition of the unvulcanized rubber sheet in parts by mass with respect to 100 parts by mass of the composite polymer (including HNBR). The form of the toothed belt had a tooth profile of H14M, a tooth pitch of 14 mm, the number of teeth of 100, a belt length of 1400 mm, and a belt width of 20 mm (Running Test Conditions)

A toothed belt was attached to a two-axis running tester including a driving pulley (the number of teeth of 28) and a driven pulley (the number of teeth of 28), and the time until tooth crack occurred was measured as the running life. The mounting tension of the toothed belt was 530 N, the rotation speed of the driving pulley was 1800 rpm, the load of the driven pulley was 4181 N, and the ambient temperature was 25° C. (room temperature).

(Measurement of Storage Elastic Modulus and Loss Coefficient)

The measurement was performed according to the constant strain flexometer test of JIS K6265 (2018) under the following conditions.

Testing machine: NETZSCH GABO "Gabometer 4000N"
Specimen: cylindrical with a diameter of 17.8 mm and a height of 25 mm
Test temperature (thermostatic bath temperature): 55° C.
Static displacement: 0.6 mm
Dynamic displacement (stroke): 0.1 mm
Repeat frequency: 30 Hz
Test time: 15 minutes (measured values after 15 minutes from the start of measurement were used)

The results of Examples 1 to 14 and Comparative Examples 1 to 4 are shown in Tables 1 to 3.

TABLE 1

|  | Examples | | | | | | |
|---|---|---|---|---|---|---|---|
|  | 1 | 2 | 3 | 4 | 5 | 6 | 7 |
| Composite Polymer 1 | 100 | 100 | 100 | 100 | 100 | 100 | 100 |
| Composite Polymer 2 | — | — | — | — | — | — | — |
| HNBR | — | — | — | — | — | — | — |
| Aramid Short Fiber (with RFL Treatment) | 1 | — | 2.5 | 1 | 1 | 1 | 1 |
| Aramid Short Fiber (without RFL Treatment) | — | — | — | — | — | — | — |
| Stearic Acid | 1 | 1 | 1 | 1 | 1 | 1 | 1 |
| Carbon black SRF | — | — | — | 5 | — | — | — |
| Silica | — | — | — | 5 | — | — | — |
| Zinc Oxide | 5 | 5 | 5 | 5 | 30 | 5 | 5 |
| Anti-aging Agent | 2 | 2 | 2 | 2 | 2 | 2 | 2 |
| Calcium Carbonate | 10 | 10 | 10 | 10 | 10 | 5 | 30 |
| Organic Peroxide | 2 | 2 | 2 | 2 | 2 | 2 | 2 |
| Total | 121 | 120 | 122.5 | 131 | 146 | 116 | 141 |
| HNBR/Unsaturated Carboxylic Acid Metal Salt | 100/110 | 100/110 | 100/110 | 100/110 | 100/110 | 100/110 | 100/110 |
| Hardness | 97 | 96 | 98 | 98 | 97 | 97 | 97 |
| Running Life (hrs) | 119 | 117 | 123 | 130 | 130 | 117 | 115 |
| Storage Elastic Modulus E' (MPa) | 750 | 500 | 790 | 800 | 760 | 740 | 680 |
| Loss Coefficient tan δ | 0.130 | 0.105 | 0.150 | 0.140 | 0.128 | 0.130 | 0.115 |

TABLE 2

|  | Examples | | | | | | |
|---|---|---|---|---|---|---|---|
|  | 8 | 9 | 10 | 11 | 12 | 13 | 14 |
| Composite Polymer 1 | — | — | 75 | 100 | 100 | 100 | 100 |
| Composite Polymer 2 | 100 | 90 | — | — | — | — | — |
| HNBR | — | 10 | 25 | — | — | — | — |
| Aramid Short Fiber (with RFL Treatment) | 1 | 1 | 1 | 1 | — | 1 | 1 |
| Aramid Short Fiber (without RFL Treatment) | — | — | — | — | 1 | — | — |
| Stearic Acid | 1 | 1 | 1 | 1 | 1 | 1 | 1 |
| Carbon Black SRF | — | — | — | — | — | — | — |
| Silica | — | — | — | — | — | — | — |
| Zinc Oxide | 5 | 5 | 5 | 30 | 30 | 5 | 5 |
| Anti-aging Agent | 2 | 2 | 2 | 2 | 2 | 2 | 2 |
| Calcium Carbonate | 10 | 10 | 10 | 10 | 10 | — | — |
| Aluminum Silicate | — | — | — | — | — | 10 | — |
| Magnesium Silicate | — | — | — | — | — | — | 10 |
| Organic Peroxide | 2 | 2 | 2 | 3 | 3 | 2 | 2 |
| Total | 121 | 121 | 121 | 147 | 147 | 121 | 121 |
| HNBR/Unsaturated Carboxylic Acid Metal Salt | 100/170 | 100/130 | 100/83 | 100/110 | 100/110 | 100/110 | 100/110 |
| Hardness | 98 | 97 | 97 | 97 | 97 | 97 | 97 |
| Running Life (hrs) | 120 | 116 | 110 | 135 | 105 | 127 | 128 |
| Storage Elastic Modulus E' (MPa) | 950 | 790 | 710 | 790 | 780 | 775 | 785 |
| Loss Coefficient tan δ | 0.150 | 0.135 | 0.128 | 0.130 | 0.132 | 0.132 | 0.133 |

TABLE 3

|  | Comparative Examples | | | |
|---|---|---|---|---|
|  | 1 | 2 | 3 | 4 |
| Composite Polymer 1 | 100 | 100 | 100 | 40 |
| Composite Polymer 2 | — | — | — | — |
| HNBR | — | — | — | 60 |
| Aramid Short Fiber (with RFL Treatment) | 1 | 1 | 1 | 1 |
| Aramid Short Fiber (without RFL Treatment) | — | — | — | — |
| Stearic Acid | 1 | 1 | 1 | 1 |
| Carbon Black SRF | 10 | — | — | — |
| Silica | 10 | — | — | — |
| Zinc Oxide | 5 | — | 5 | 5 |
| Anti-aging Agent | 2 | 2 | 2 | 2 |
| Calcium Carbonate | 10 | 10 | — | 10 |
| Organic Peroxide | 2 | 2 | 2 | 2 |
| Total | 141 | 116 | 111 | 121 |
| HNBR/Unsaturated Carboxylic Acid Metal Salt | 100/110 | 100/110 | 100/110 | 100/27 |
| Hardness | 98 | 96 | 96 | 91 |
| Running Life (hrs) | 29 | 85 | 60 | 4 |
| Storage Elastic Modulus E' (MPa) | 790 | 700 | 760 | 150 |
| Loss Coefficient tan δ | 0.178 | 0.155 | 0.160 | 0.105 |

Even when the short fibers were not contained or the proportion of the short fibers was as small as 1 part by mass to 2.5 parts by mass, the running life was as long as 117 hours to 123 hours as in Examples 1 to 3. The running life of Comparative Example 1 in which the proportion of the reinforcing filler (sum of carbon black and silica) was 20 parts by mass was as short as 29 hours, whereas the running life of Examples 1 and 4 in which the reinforcing filler was not contained or the proportion of the reinforcing filler was 10 parts by mass was as long as 119 hours and 130 hours, respectively. While the running life of Comparative Example 2 not containing zinc oxide was 85 hours which is relatively short, the running life of Examples 1 and 5 in which the proportion of zinc oxide was 5 parts by mass and 30 parts by mass was as long as 119 hours and 130 hours, respectively. While the running life of Comparative Example 3 not containing the non-reinforcing filler (calcium carbonate) was as short as 60 hours, the running life of Examples 1, 6, and 7 containing the non-reinforcing filler at a proportion of 5 parts by mass to 30 parts by mass was as long as 115 hours to 119 hours. The running life of Comparative Example 4 in which the mass ratio of the unsaturated carboxylic acid metal salt to the hydrogenated nitrile rubber was the former/the latter=100/27 was as short as 4 hours, whereas the running life of Examples 1 and 8 to 10 in which the mass ratio of the unsaturated carboxylic acid metal salt to hydrogenated nitrile rubber was as large as the former/the latter=100/83 to 100/170 was as long as 110 hours to 120 hours. From these results, it can be seen that the present invention is effective in improving the tooth crack resistance of the toothed belt.

Example 11 was an example containing 30 parts by mass of zinc oxide and 3 parts by mass of an organic peroxide, and the running life thereof was 135 hours which was the longest. It is considered that the effect of suppressing the deformation of the rubber was improved by the increased content of the organic peroxide, the heat aging resistance was improved by the increased content of zinc oxide, and thus the tooth crack resistance was improved. Example 12 is an example in which the short fibers were not subjected to RFL treatment. The running life thereof was relatively long, but the running life was inferior to that of Example 11 in which the short fibers were subjected to RFL treatment. Although the RFL treatment to the short fibers is not essential, it can be said that it is preferable to perform the RFL treatment.

Further, for Examples 13 and 14 which were examples using aluminum silicate and magnesium silicate instead of calcium carbonate as the non-reinforcing filler, there was no significant difference in running life and loss coefficient as compared with Example 1 using calcium carbonate, and Examples 13 and 14 showed the similar performance as in Example 1.

Focusing on the relationship among the storage elastic modulus, loss coefficient and running life, it can be confirmed that the running life of Examples 1 to 14 satisfying both the two conditions of high storage elastic modulus (400 MPa or more) and small loss coefficient (0.150 or less) was long.

INDUSTRIAL APPLICABILITY

The rubber toothed belt (meshing power-transmission belt or toothed power-transmission belt) of the present invention can be used in various fields in which synchronization of input and output is required in combination with a toothed pulley, for example, power transmission of engines in an automobile or a motorcycle, power transmission of motors, pumps, or the like, machinery such as an automatic door or an automated machine, copiers, printers, or the like. In particular, the present invention can be used as peripheral devices (peripheral components) such as a power-transmission belt (timing belt or cogged belt) for an automobile engine.

Although the preferred embodiments of the present invention has been described above, the present invention is not limited to the embodiments described above, and various design changes can be made within the range described in the claims. This application is based on Japanese Patent Application No. 2018-221012, filed on Nov. 27, 2018 and Japanese Patent Application No. 2019-194368, filed on Oct. 25, 2019, the contents of which are incorporated by reference herein.

REFERENCE SIGN LIST

1 Toothed belt
2 Belt main body
3 Tooth portion
4 Back portion
5 Core wire
6 Short fibers
7 Tooth cloth (Cover cloth)

The invention claimed is:

1. A rubber toothed belt comprising:
a belt main body comprising a plurality of tooth portions provided at predetermined intervals along a longitudinal direction of the belt and comprising a first rubber composition, a back portion integrated with the tooth portions and comprising a second rubber composition, and a core wire embedded in the back portion in the longitudinal direction; and
a tooth cloth covering surfaces of the tooth portions,
wherein the first rubber composition forming the tooth portions comprises a composite polymer comprising a hydrogenated nitrile rubber and an unsaturated carboxylic acid metal salt in a mass ratio of the former/the latter=100/80 to 100/180, and comprises, with respect to 100 parts by mass of the composite polymer, 3 parts by mass to 50 parts by mass of a zinc oxide, 3 parts by mass to 50 parts by mass of a non-reinforcing filler, 10 parts by mass or less of a reinforcing filler, 5 parts by mass or less of short fibers, and 1 part by mass to 5 parts by mass of an organic peroxide.

2. The rubber toothed belt according to claim 1, wherein the non-reinforcing filler is at least one selected from the group consisting of polyvalent metal carbonate, a polyvalent metal hydroxide, a polyvalent metal sulfate, and a silicate, and the reinforcing filler is at least one selected from the group consisting of carbon black and a silica.

3. The rubber toothed belt according to claim 1, wherein the first rubber composition comprises, with respect to 100 parts by mass of the composite polymer, 5 parts by mass to 40 parts by mass of the zinc oxide, 5 parts by mass to 40 parts by mass of the non-reinforcing filler, 0 parts by mass to 8 parts by mass of the reinforcing filler, and 0.5 parts by mass to 2.7 parts by mass of the short fibers.

4. The rubber toothed belt according to claim 1, wherein, in the first rubber composition, a mass ratio of the zinc oxide and the non-reinforcing filler is the former/the latter=10/100 to 500/100, and a mass ratio of the short fibers and the non-reinforcing filler is the former/the latter=0/100 to 40/100.

5. The rubber toothed belt according to claim 1, wherein the non-reinforcing filler is a calcium carbonate, and in the first rubber composition, the mass ratio of the zinc oxide and the non-reinforcing filler is the former/the latter=25/100 to 150/100, and the mass ratio of the short fibers and the non-reinforcing filler is the former/the latter=2/100 to 30/100.

6. The rubber toothed belt according to claim 1, wherein an adhesive component is attached to at least a part of surfaces of the short fibers.

7. The rubber toothed belt according to claim 6, wherein the adhesive component comprises a resorcin-formalin-latex (RFL) or a cured product thereof.

8. The rubber toothed belt according to claim 1, wherein a vulcanized first rubber composition has a storage elastic modulus (E') of 400 MPa to 1000 MPa, and a loss coefficient (tan $\delta$) of 0.05 to 0.15.

9. A rubber composition comprising a composite polymer comprising a hydrogenated nitrile rubber and an unsaturated carboxylic acid metal salt in a mass ratio of the former/the latter=100/80 to 100/180, and comprising, with respect to 100 parts by mass of the composite polymer, 3 parts by mass to 50 parts by mass of a zinc oxide, 3 parts by mass to 50 parts by mass of a non-reinforcing filler, 10 parts by mass or less of a reinforcing filler, 5 parts by mass or less of short fibers, and 1 part by mass to 5 parts by mass of an organic peroxide.

* * * * *